(12) United States Patent
Hautamäki et al.

(10) Patent No.: US 7,706,322 B2
(45) Date of Patent: *Apr. 27, 2010

(54) ALLOCATION OF RESOURCES IN PACKET-SWITCHED DATA TRANSFER

(75) Inventors: Minna Hautamäki, Tampere (FI); Arto Leppisaari, Tampere (FI); Mika Forssell, Espoo (FI)

(73) Assignee: Nokia Corporation, Espoo (FI)

( * ) Notice: Subject to any disclaimer, the term of this patent is extended or adjusted under 35 U.S.C. 154(b) by 663 days.

This patent is subject to a terminal disclaimer.

(21) Appl. No.: 11/468,340

(22) Filed: Aug. 30, 2006

(65) Prior Publication Data

US 2007/0201396 A1    Aug. 30, 2007

Related U.S. Application Data

(63) Continuation of application No. 09/824,161, filed on Apr. 2, 2001, now Pat. No. 7,123,595.

(30) Foreign Application Priority Data

Apr. 3, 2000  (FI) .................................. 20000779

(51) Int. Cl.
*H04W 4/00* (2006.01)
(52) U.S. Cl. ..................................................... 370/328
(58) Field of Classification Search ........................ None
See application file for complete search history.

(56) References Cited

U.S. PATENT DOCUMENTS 6,282,182 B1    8/2001    Pecen et al.

(Continued)

FOREIGN PATENT DOCUMENTS

EP    1 045 559 A1    4/1999

(Continued)

OTHER PUBLICATIONS

GSM 04.60; ETSI EN 301 349 V7.0.1 (Dec. 1999); chapters 5.2.1, 5.2.2, 8.1.2.5, 9.3.2.5, 9.3.3.5.

*Primary Examiner*—Anh-Vu Ly
(74) *Attorney, Agent, or Firm*—Perman & Green LLP (57) ABSTRACT

The disclosed embodiments relate to a method for arranging the transfer of packets between a wireless data transfer device (MS) and a mobile communication network (NW). For transferring packets between the wireless data transfer device (MS) and the mobile communication network (NW), temporary block flows (UL TBF, DL TBF) are formed, and information is transferred in these block flows in one or more packet data traffic channels (PDTCH) either in the first direction from the mobile communication network (NW) to the wireless data transfer device (MS) or in the second direction from the wireless data transfer device (MS) to the mobile communication network. In the method, information about the end of the block flow is set in a packet to be transmitted in a block flow when data transfer has stopped. When the transfer of packets in said first direction has stopped, at least one enquiry message is also sent from the mobile communication network (NW) to the wireless data transfer device (MS). If there are packets to be sent to the mobile communication network (NW) in the wireless data transfer device (MS), a reply message to the enquiry message is sent from the wireless data transfer device (MS), which also sets information about the need to send packets in the reply message.

24 Claims, 7 Drawing Sheets

U.S. PATENT DOCUMENTS

| | | |
|---|---|---|
| 6,532,225 B1 | 3/2003 | Chang et al. |
| 6,601,207 B1 | 7/2003 | Vanttinen |
| 6,671,511 B1 | 12/2003 | Forssell et al. |
| 6,683,860 B1 | 1/2004 | Forssell et al. |
| 6,711,406 B1 | 3/2004 | Lintulampi et al. |
| 6,718,179 B1 | 4/2004 | Forssell et al. |
| 7,123,595 B2 * | 10/2006 | Hautamaki et al. .......... 370/329 |
| 2004/0120253 A1 | 6/2004 | Forssell et al. |

FOREIGN PATENT DOCUMENTS

| | | |
|---|---|---|
| EP | 0 959 589 A2 | 11/1999 |
| EP | 1 006 695 A1 | 11/1999 |
| EP | 1 021 017 A2 | 1/2000 |
| EP | 1 045 559 A1 | 10/2000 |
| WO | WO 00/42806 A3 | 7/2000 |
| WO | WO 00/54464 | 9/2000 |
| WO | WO 00/62491 | 10/2000 |

* cited by examiner

Prior Art

ALLOCATION OF RESOURCES IN PACKET-SWITCHED DATA TRANSFER

CROSS-REFERENCE TO RELATED APPLICATIONS

This application is a continuation of, claims priority to, U.S. patent application Ser. No. 09/824,161, filed on Apr. 2, 2001, now U.S. Pat. No. 7,123,595, the disclosure of which is incorporated by reference herein in its entirety.

BACKGROUND FIELD

The disclosed embodiments relates to date transfer between a wireless date transfer device and a mobile communication network.

BRIEF DESCRIPTION OF RELATED DEVELOPMENTS

The term "wireless data transfer system" is generally used to mean any data transfer system, which enables a wireless data transfer connection between a wireless data transfer device (MS) and fixed parts of the system when the user of the wireless data transfer device is moving in the operating region of the system. A typical wireless data transfer system is the Public Land Mobile Network PLMN. Most of the wireless data transfer systems that exist at the time of filing this application belong to so-called second generation wireless data transfer device systems, an example of which is the widely known GSM system (Global System for Mobile telecommunications). The present invention is especially suitable for the packet-switched wireless data transfer device systems being developed now. An example of these wireless data transfer device systems used in this specification is the GPRS system (General Packet Radio Service), the standardization of which is under way now. It is clear that the invention can also be applied in other wireless data transfer device systems in which packet-switched data transfer is applied.

The General Packet Radio Service (GPRS) is a new service being developed for the GSM wireless data transfer device system. The operational environment of the GPRS system comprises one or more subnetwork service areas, which are combined as a GPRS backbone network. The subnetwork comprises several Support Nodes (SN), examples of which used in this specification are the Serving GPRS Support Nodes (SGSN), which are connected to the mobile network (typically via a connection unit to the base station) so that they can offer packet switched services to the wireless data transfer devices via the base stations (cells). The mobile network offers packet-switched information transfer between the support node and the wireless data transfer device. Different subnetworks, in turn, are connected via the GPRS Gateway Support Nodes (GGSN) to an external data network, such as a Public Switched Data Network (PSDN). The GPRS service thus enables packet-switched transfer of information between a wire-less data transfer device and an external data network, whereby certain parts of the mobile network form an access network.

In order to use the GPRS services, the wireless data transfer device performs at first a GPRS attach, by which it notifies that it is ready for the transmission of packet data. The attach forms a logical link between the wireless data transfer device and the support node SGSN, and thus enables the transmission of short messages (SMS, Short Message Services) via the GPRS network, paging via a support node and notification of packet data to the wireless data transfer device. While the wireless data transfer device is attaching to the network, the support node performs the mobility management (MM) operation and user identification. In order to transmit and receive information, a Packet Data Protocol (PDP) is activated, whereby a packet data address to be used in a packet data connection is specified for the wireless data transfer device, and thus the address of the wireless data transfer device is known in the gateway GPRS support node. When the attach is performed, a data transfer connection is established with the wireless data transfer device, the support node and the gateway GPRS support node, and a protocol (such as (X.25 or IP), a connection address (e.g. X.121 address), Quality of Service and Network Service Access Point Identifier (NSAPI) are specified for the connection. The wireless data transfer device activates a packet data connection with an Activate PDP Context Request, in which the wireless data transfer device gives the Temporary Logical Link Identity (TLLI), the type of the packet data connection, the address, the required Quality of Service, the Network Service Access Point Identifier and possibly also the Access Point Name (APN).

The Quality of Service specifies, for instance, how Packet Data Units (PDU) are handled during the transfer in the GPRS network. The Qualities of Service defined for connection addresses, for example, are used to control the order of transmission, buffering (packet queues) and the rejection of packets in the support node and the gateway GPRS support node especially in situations where there are packets to be sent in two or more connections simultaneously. Different qualities of service specify different delays for the transfer of packets between different ends of the connection, different bit rates, and the number of packets rejected may be different in connections with different qualities of service. Four different Quality of Service classes have been formed in the GPRS system, and these classes specify the Quality of Service offered by the LLC layer to the connection.

Reliability determines whether acknowledgement is used (ARQ) or not (no ARQ) in the Logical Link Control (LLC) and Radio Link Control (RLC) layer in data transfer. In addition, reliability determines whether protected mode is used in non-acknowledged data transfer, and whether the GPRS backbone network uses the TCP or UDP protocol in the transfer of packets that belong to the connection.

Figure 1:
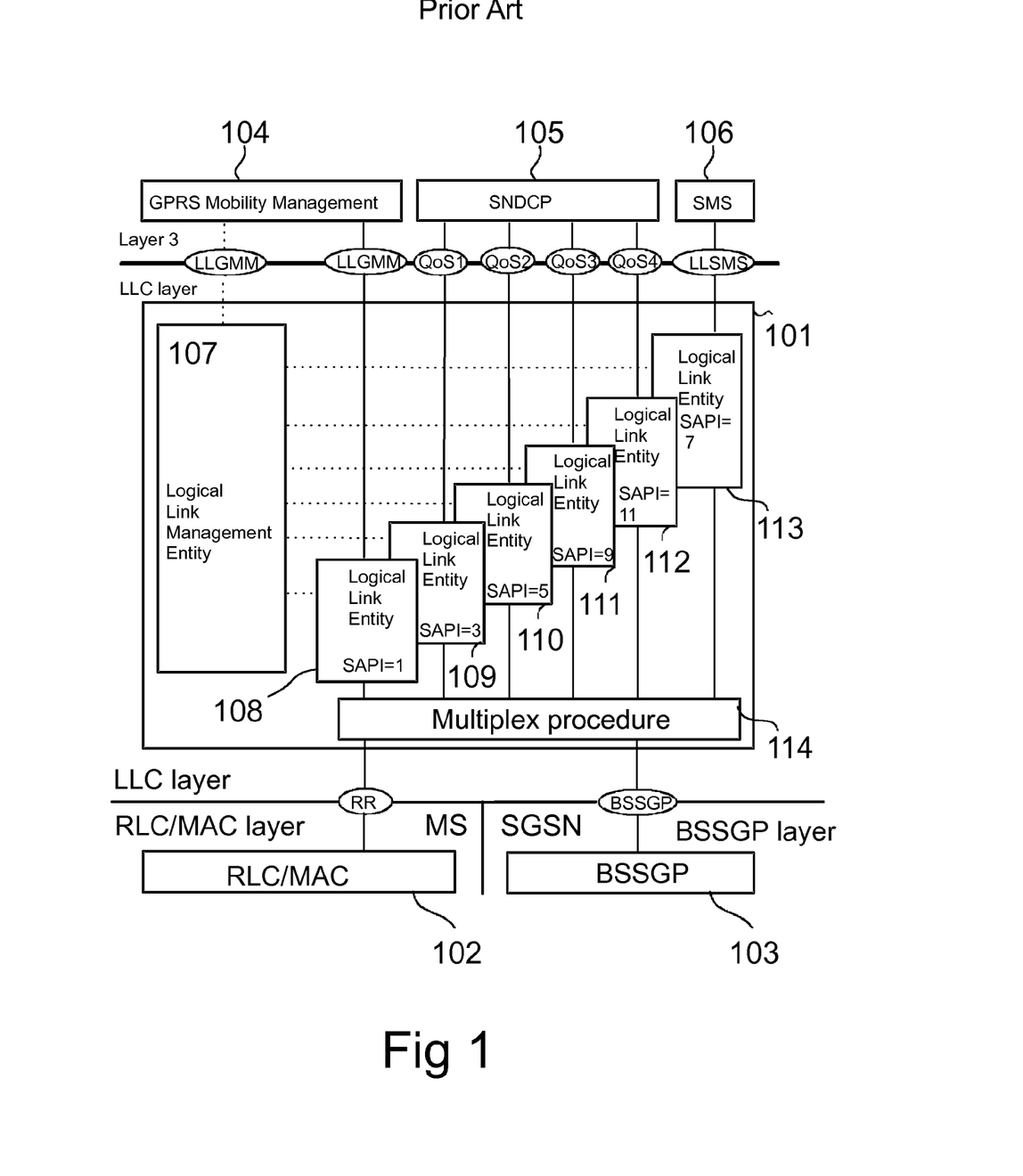
FIG. 1 shows a prior art protocol stack.

The attached FIG. 1 shows the operation of a known LLC protocol layer 101 in the wireless data transfer device and in the GPRS support node. Block 102 represents the operations of the known RLC/MAC (Radio Link Control/Media Access Control) layer that are needed between the LLC layer 101 and the wireless data transfer device (not shown). Correspondingly, block 103 represents the operations of the known BSSGP (Base Station Subsystem GPRS Part) layer that are needed between the LLC layer 101 and the closest serving GPRS support node (not shown). The interface between the LLC layer 101 and the RLC/MAC layers is called the RR interface, and the interface between the LLC layer 101 and the BSSGP layers is called the BSSGP interface.

Above the LLC layer 101, there are the known GPRS mobility management operations 104, the SNDCP operations 105 and the short message service operations 106, which belong to layer 3 in the layered structure described here. Each of these blocks has one or more connection points to the LLC layer 101 for connecting to its different parts. The logical link control block 107 has a Logical Link-GPRS Mobility Management (LLGMM) control connection to block 104. The mobility management information is routed via the LLGMM connection between the blocks 104 and the first LLE (Logical Link Entity) block of the LLC layer. The second 109, third 110, fourth 111 and fifth 112 LLE block are connected to block 105 via corresponding connections. These blocks are also called QoS 1, QoS 2, QoS 3 and QoS 4 according to the Quality of Service of the packets handled by these blocks. The sixth LLE block 113 of the LLC layer is connected to the block 106 via the LLSMS (Logical Link-Short Message Service) connection. The Service Access Point Identifiers of the first 108, second 109, third 110, fourth 111, fifth 112 and sixth LLE block are 1, 3, 5, 9, 11 and 7, respectively. Each of these LLE blocks is linked in the LLC layer to the multiplexing block 114, which processes connections via the RR interface to block 102 and further to the wireless data transfer device, as well as connections via the BSSGP connection to block 103 and further towards the support node SGSN.

The connection between the multiplexing block 114 and block 102 of the lower level towards the wireless data transfer device is called the transmission pipe. All packet data flows between the upper parts of the LLC layer and the lower layers 102 go through the same multiplexing block 114 and transmission pipe. For the packet data transfer of the LLC layer 101 in the GPRS system, it is possible to create Temporary Block Flows (TBF) between the wireless data transfer device and the mobile network. Such a temporary block flow can be started either by the wireless data transfer device or the mobile network. These temporary block flows are temporary block flows of the RLC/MAC layer, in which information of the LLC layer is transferred. A temporary block flow may be intended for data transfer either from the mobile network to the wireless data transfer device, which is denoted shortly by DL TBF (Downlink TBF) in the signalling diagrams of FIGS. 2, 3a and 3b, or from the wireless data transfer device to the mobile network, in which case it is denoted by UL TBF (Uplink TBF).

Figure 2:
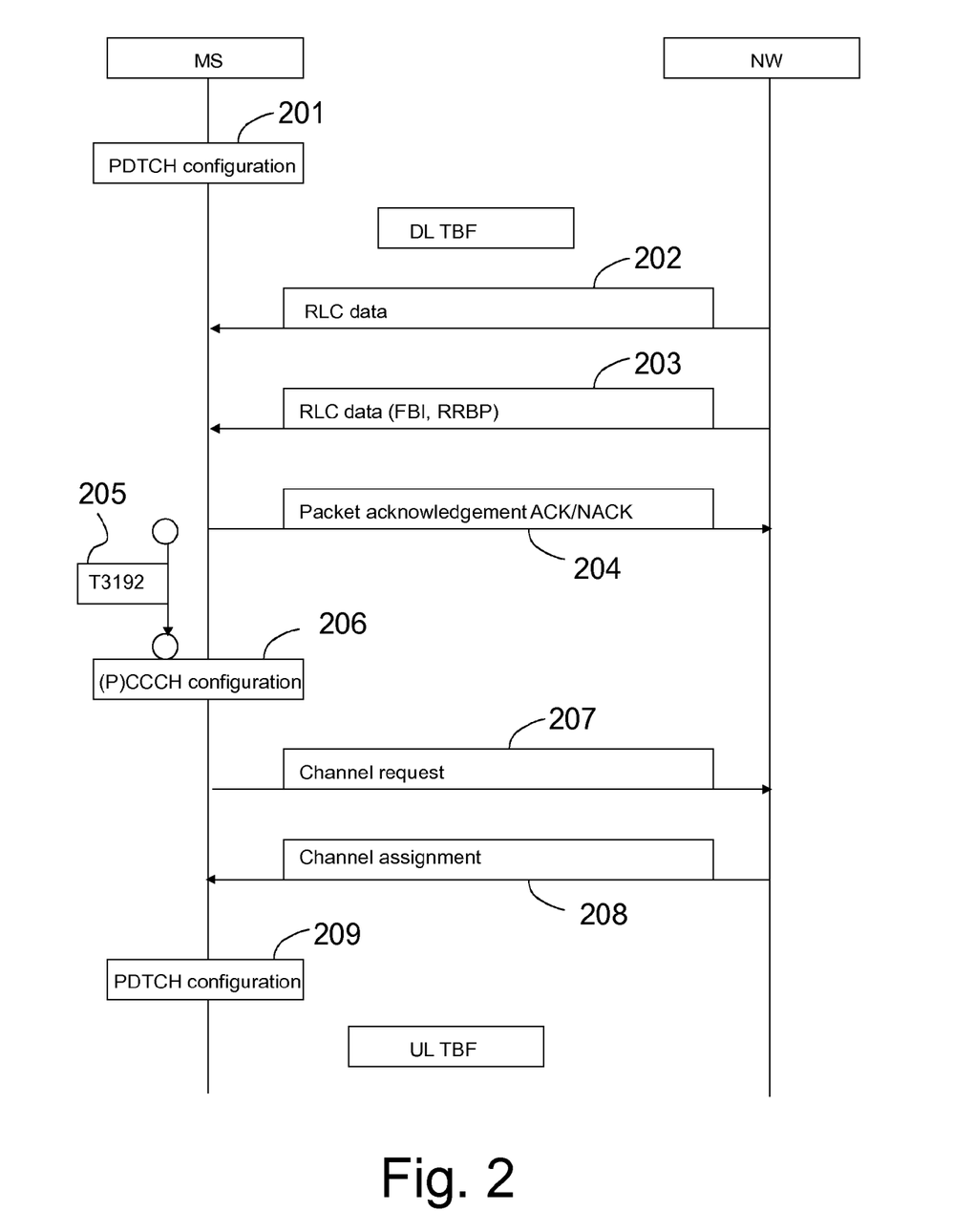
FIG. 2 is a schematic signalling diagram of the establishment of a packet-switched connection according to prior art.

FIG. 2 is a signalling diagram of prior art packet data transfer, in which temporary block flows are used. The block flow is preferably formed by means of a control channel, such as PCCCH or CCCH, by configuring a packet channel PDTCH. This is represented by block 201 in FIG. 2. When the temporary block flow has been formed, the transfer of packets is started (arrow 202). Each RLC packet sent by the mobile network to the wireless data transfer device contains a Final Block Indicator (FBI). The purpose of this final block indicator is to inform the wireless data transfer device when the mobile network no longer has information to be sent to the wireless data transfer device in the block flow, whereupon this temporary block flow can be stopped. In order to receive packets, the wireless data transfer device switches to the Packet Transfer Mode and starts listening to the packet data channel and receiving packets.

The mobile network sets information about this in the last packet to be transmitted (arrow 203), for example by setting the final bit of the packets in the packet header field to the value true (e.g. the logical mode 1). Then the wireless data transfer device knows that it was the last packet received in this block flow. This packet also contains the Relative Reserved Block Period (RRBP) field, in which the mobile network can inform the wireless data transfer device in which time slot the wireless data transfer device can send the acknowledge message. Having received this last packet, the wireless data transfer device transmits an acknowledgement message (204) to the mobile network in the given time slot and starts a timer (block 205), such as T3192 in the GPRS system, for time-out consideration. If the RLC Acknowledged Mode has been used in the block flow, the wireless data transfer device sends as acknowledgement the Packet Downlink Ack/Nack message, in which the Final Ack Indicator (FAI) is set to the value true, preferably the logical mode 1. The value of this final bit notifies the mobile network that retransmission of packets is not needed (any more), because all packets have been received. If the RLC Unacknowledged Mode has been used in the block flow, the wireless data transfer device sends the Packet Control Ack message as the acknowledgement message. The wireless data transfer device still continues listening to the packet data transfer channel PDTCH in case the wireless data transfer device would have to send the acknowledgement message again, until the time set in the timer T3192 has expired. After this, the wireless data transfer device switches to the idle state.

A timer is also started in the mobile network, such as T3193 in the GPRS system, when the mobile network has received the acknowledgement message from the wireless data transfer device. After the time specified in the timer has expired, the mobile network releases the temporary block flow.

If the wireless data transfer device has packets to be sent in the idle mode, the wireless data transfer device cannot start sending these packets directly, but it must at first switch from the idle mode to the active mode (packet transmission mode). After this, the wireless data transfer device starts the procedure for forming a temporary block flow in the control channel, such as the above mentioned PCCCH or CCCH control channel (block 206). The transfer of packets from the wireless data transfer device to the mobile network can be started after the temporary block flow has been formed. The signalling performed during the formation is represented by arrows 207 and 208, and the configuration of the packet channel by block 209. The time needed for the request for resources and the formation of the temporary block flow may be as much as several seconds. In practice, an arrangement like the one described above delays the transfer of packets, because the wireless data transfer device must first wait for the end of the time-out consideration and switch to the idle mode before a new temporary block flow can be formed. In addition, establishing the connection causes extra loading of the control channel. Situations like the one described above arise especially in connection with the signalling processes, in which the wireless data transfer device must send a reply to a message sent by the mobile network substantially immediately.

If the mobile network has asked, in connection with the transmission of packets, the wireless data transfer device to send acknowledgement messages, the wireless data transfer device can inform the mobile network of the need to send packets in these acknowledgement messages. However, the mobile network does not always ask for acknowledgements, and so in a situation like this the wireless data transfer device does not have a chance to ask for resources for the transfer of packets before the acknowledgement after the reception of the last packet. Because at this stage the temporary block flow has ended and no transmission time slot has been reserved for the wireless data transfer device, the wireless data transfer device cannot send a request for resources. This means that the wireless data transfer device must switch to the idle mode and back before it can ask for resources for the transmission of packets.

Even when the acknowledged mode is used, there may be problems in sending the block flow request on time. The wireless data transfer device can set a Channel Description IE in the acknowledgement message, whereby the mobile network may try to allocate resources for establishing a temporary block flow from the wireless data transfer device to the mobile network. In this situation, the mobile network sends a resource allocation message (such as Packet Uplink Assignment) to the wireless data transfer device, after which the wireless data transfer device can start the transmission of packets. However, in all situations the wireless data transfer device does not have time to ask for the allocation of resources before it has to send the acknowledgement message. The reason for this may be, for instance, that packets of an application layer (e.g. information related to an Internet browser, such as information of a home page) are being transmitted in an RLC packet received by the wireless data transfer device in a block flow, in which case the packet must be moved from the RLC layer to the LLC layer. In the LLC layer, the LLC frame structure is dismantled and transferred to the TCP/IP layer via the SNDCP layer. From the TCP/IP layer, the information contained by the packet is transmitted to the application. After this, the application can form a reply message, for example, to be transmitted further via the mobile network. Reverse measures are then performed, i.e. the information of the application layer is transformed via the intermediate layers to information of the LLC layer and further to RLC packets. The time taken by this whole process may be so long that information about the need to transmit packets is not received in the RLC layer before the acknowledgement message of the RLC layer is sent to the mobile network.

In the GPRS system, the wireless data transfer device has a time of 13-26 TDMA frames (one frame is ca. 4.615 ms) to send an acknowledgement message. This time is influenced by the value of the RRBP field in the packet transmitted by the mobile network. This means that the upper layers of the protocol stack have approx. 60 to 120 ms of time to form the packet to be transmitted and move it to the RLC layer. In practical situations this does not often succeed, and thus the wireless data transfer device must first switch to the idle mode before a temporary packet flow from the wireless data transfer device to the mobile network can be formed.

SUMMARY

The disclosed embodiments can reduce the above mentioned drawbacks and to accomplish a more efficient method and system in packet-switched data transfer between a wireless data transfer device and a mobile network. The invention is based on the idea that when the last packet of each packet transfer has been transferred from the mobile network to a wireless terminal device, such as a wireless data transfer device, a enquiry message is transmitted from the mobile network to the wireless terminal device, to which enquiry message the terminal device can send a reply and when required, ask for resources for data transfer from the wireless terminal device to the mobile network. If there are packet data units to be sent in the wireless data transfer device, the formation of a temporary block flow can be started without the wireless data transfer device switching to the idle mode and back.

The disclosed embodiments provide considerable advantages as compared to the prior art methods and systems. With the method according to the invention, the transfer of packets from the wireless data transfer device can be started faster than in the prior art solutions. In addition, the invention can reduce the traffic on the control channel when a temporary block flow is formed, and thus the resources of the mobile network can be used more efficiently.

DESCRIPTION OF THE DRAWINGS

In the following, the invention will be described in more detail with reference to the accompanying drawings, in which.

DESCRIPTION OF THE EMBODIMENTS

A wireless data transfer system of the GPRS type shown as a simplified diagram in FIG. 4 will be used as an example in the following description of a preferred embodiment of the invention, but it is clear that the invention is not limited to this system only, but it can also be applied in other message transmission systems, in which packet-switched data transmission is used. In a mobile network, which uses the GPRS system, data transfer between the wireless data transfer device MS and the support node SGSN of the mobile network is preferably performed via the base station BS.

The transfer of packets from the mobile network NW towards the wireless data transfer device MS will be discussed at first in the following. It is assumed that the wireless data transfer device MS is in the idle mode and that it listens to the traffic of a control channel in order to detect messages possibly sent to the wireless data transfer device.

Figure 3A:
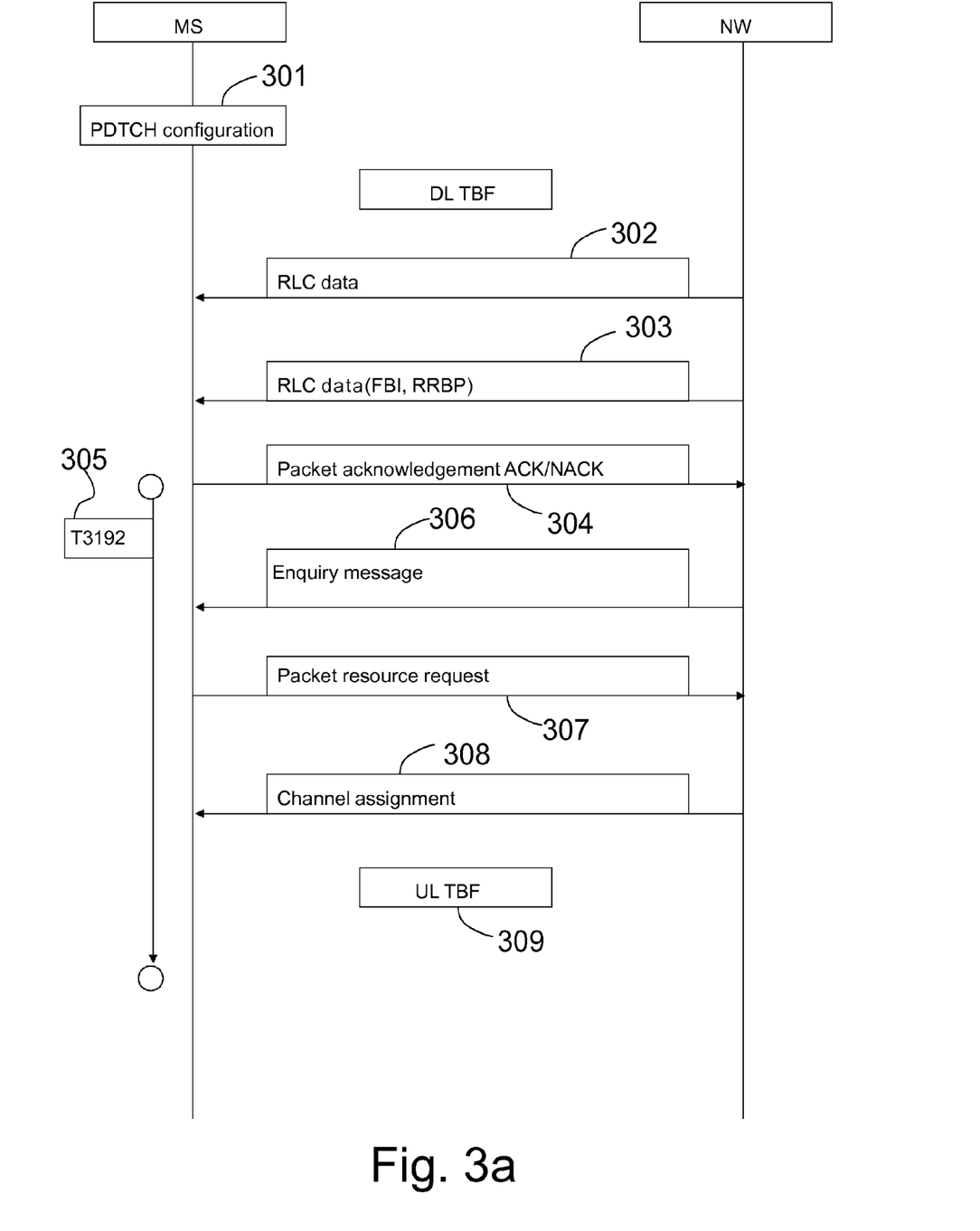
FIG. 3a is a schematic signalling diagram of the establishment of a packet-switched connection from the wireless data transfer device to the mobile network according to a preferred embodiment of the invention.
Figure 3B:
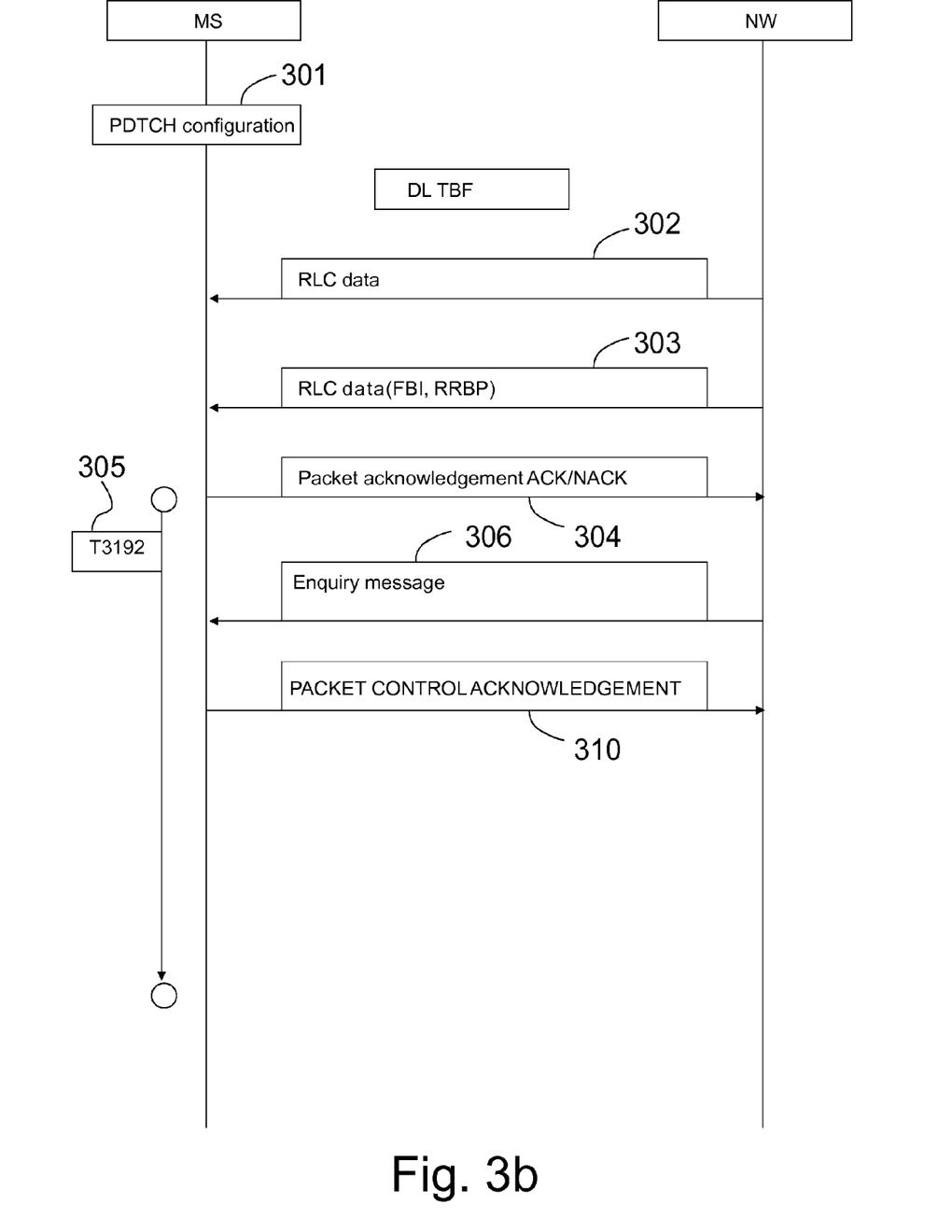
FIG. 3b is a schematic signalling diagram of a situation in which there are no packets to be sent to the mobile network in the wireless data transfer device.

In order to start the transfer of packets, the procedure for establishing a temporary block flow is started at first. In the following example, the establishment of a temporary block flow will be described using the PCCCH channel as the control channel, but the corresponding principles can also be applied to the CCCH channel. FIG. 3a illustrates the establishment of the connection and the transfer of packets between the wireless data transfer device MS and the mobile network NW as a schematic signalling diagram. Correspondingly, FIG. 3b illustrates a situation in which the transmission of packets from the wireless data transfer device MS is not started when the transmission of packets received from the mobile network NW has ended. In a situation that there are packets of the LLC layer to be sent to the wireless data transfer device MS from the mobile network NW, the support node SGSN starts the establishment of a temporary connection. The wireless data transfer device is then preferably in the idle mode and listens to the traffic in the control channel. In order to start data transfer, a packet data traffic channel PDTCH, where resources are allocated for the packet-switched connection, is configured (block 301). The mobile network NW allocates one or more Packet Data Traffic Channels (PDTCH) for the connection. The number of channels (e.g. time slots) to be allocated depends on, for instance, the settings made by the operator of the mobile network NW, the Quality of Service reserved for the connection, the packet connection properties of the receiving wireless data transfer device, etc. The mobile network NW sends a Packet Downlink Assignment message to the wireless data transfer device MS. The assignment message may contain, for instance, the Temporary Flow Identity (TFI), timing information, on the basis of which the wireless data transfer device can estimate the starting time of the transmission of data packets, and information about the time slot or periods in which the packets of the packet connection are transferred. In order to receive packets, the wireless data transfer device switches to the Packet Transfer Mode and preferably starts the timer. The identifier T3190 is used for this timer in the GPRS system. After this, the wireless data transfer device starts listening to the packet data traffic channel and receiving packets. The purpose of the timer is to prevent the wireless data transfer device from staying in the packet reception mode in error situations and when the transmission of packets has ended. Error situations may arise when, for example, the wireless data transfer device cannot receive packets for some reason or the mobile network does not send packets. Error situations are not dealt with in more detail in this specification, because the procedures are known as such.

The mobile network sends packets in the packet data traffic channel PDTCH (arrow 302). The wireless data transfer device MS receives each packet and sends an acknowledgement message, if the mobile network NW has asked for it. By the acknowledgement message, the wireless data transfer device MS can inform the mobile network NW that the packet has either been received successfully (ACK) or that there have been errors in the reception (NACK). If the mobile network NW has asked for the transmission of acknowledgement messages, the wireless data transfer device MS can also use the acknowledgement messages to notify the mobile network NW of the need to transmit packets as long as the temporary block flow DL TBF is activated.

The mobile network NW sets information about the end of the packets in the last packet to be transmitted (arrow 303), for example by setting the Final Block Indicator (FBI) in the packet header field to the value true (e.g. the logical mode 1). Then the wireless data transfer device MS knows that it was the last packet received in this block flow. The wireless data transfer device sends an acknowledgement message to the mobile network (arrow 304) and starts another timer, such as T3192 in the GPRS system (block 305).

After the mobile network NW has received information that the last packet has been received, in a system according to a preferred embodiment of the invention the mobile network sends a enquiry message 306 (such as Packet Power Control/Timing Advance (RRBP)), in which the enquiry information (the RRBP field in the GPRS system) has been set, and the wireless data transfer device can answer the enquiry by using the radio resource reserved for the wireless data transfer device MS, which was notified in the enquiry message. In addition, preferably the same identifier TFI reserved for the wireless data transfer device as was used in the ended block flow is used in this enquiry message. Setting the enquiry information in the message means in practice that the wireless data transfer device MS is expected to send a reply message in the allocated radio resource.

If, however, the wireless data transfer device MS has packets to be sent, it does not send the normal Packet Control Acknowledgement message, but having received this enquiry message, the wireless data transfer device sends a PACKET_RESOURCE_REQUEST 307 to the mobile network NW for establishing a temporary block flow for the transfer of packets, if there are packets in the wireless data transfer device MS waiting for transmission. In addition, the wireless data transfer device preferably starts the timer T3168 and continues listening to the packet data traffic channels PDTCH. In other case, the wireless data transfer device MS replies normally with the PACKET_CONTROL_ACKNOWLEDGEMENT message 310 (FIG. 3b). If the wireless data transfer device MS did send a request for the allocation of packet resources, the mobile network NW detects that the wireless data transfer device MS has packets to be sent and can start the allocation of resources for a new temporary block flow.

If the wireless data transfer device MS did send a resource allocation request 307 to the mobile network NW, it is examined whether it has sufficiently resources available at the moment for the establishment of a block flow. If there are resources available, the mobile network NW sends a PACKET_UPLINK_ASSIGNMENT message 308 to the wireless data transfer device MS. After the configuration measures needed for establishing a temporary block flow have been performed, the wireless data transfer device MS can start the transfer of packets essentially immediately (block 309). After this, operation continues in a manner known as such.

Figure 3C:
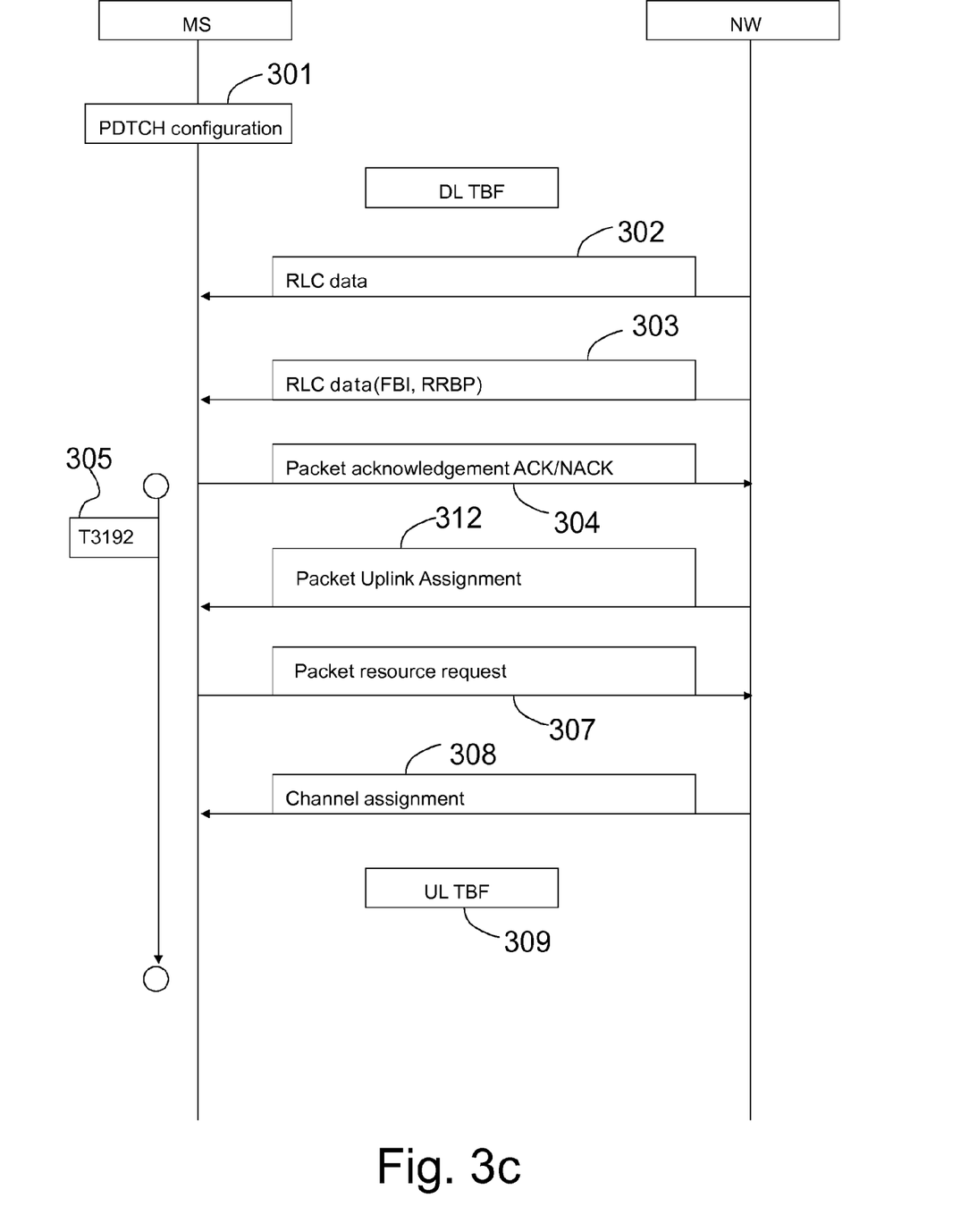
FIG. 3c is a schematic signalling diagram of the establishment of a packet-switched connection from the wireless data transfer device to the mobile network according to another preferred embodiment of the invention.

In a system according to another preferred embodiment of the invention, which is shown as a schematic signalling diagram in FIG. 3c, the procedure is the following. After the mobile network NW has received information that the last packet has been received, the mobile network sends in a data channel an assignment message 312 (such as Packet Uplink Assignment), in which the wireless data transfer device has been informed in which time slot it can send a temporary packet resource allocation request 307, if required. After this, the operation continues as shown in FIG. 3a.

Figure 3D:
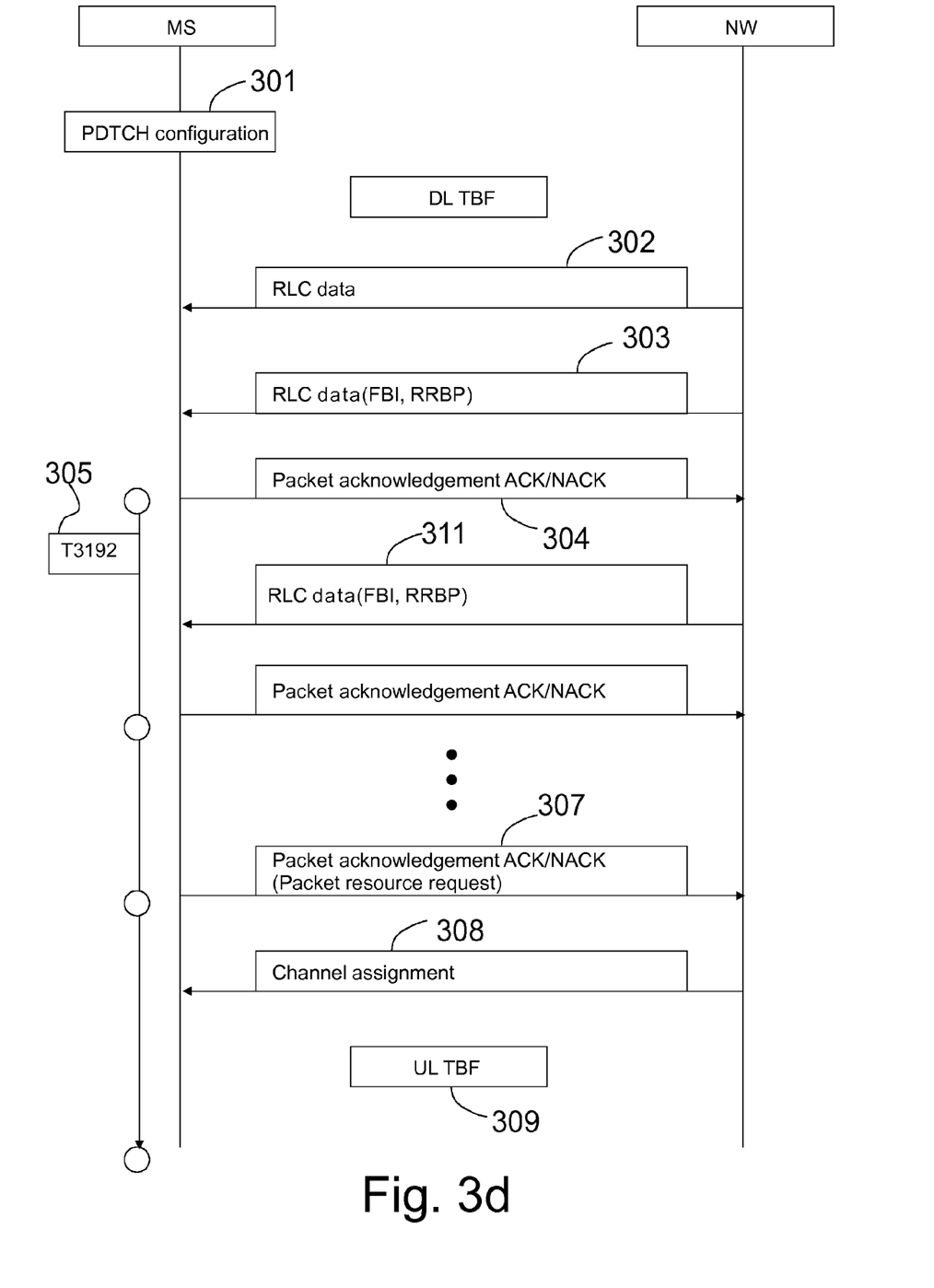
FIG. 3d is a schematic signalling diagram of the establishment of a packet-switched connection from the wireless data transfer device to the mobile network according to yet another preferred embodiment of the invention.

In a system according to yet another preferred embodiment of the invention, the procedure may also be the following (FIG. 3d). The mobile network sends 311 advantageously the last data packet again after the mobile network NW has received information that the last packet has been received. In this retransmitted packet, the final bit has been set in the value true, and the wireless data transfer device has been allocated a resource for sending acknowledgement. In addition, in this repeated packet it is also possible to try to set the value of the RRBP field such that the wireless data transfer device MS would have as long a time as possible for sending the acknowledgement message. The wireless data transfer device is expected to send acknowledgement to this message. If the RLC layer in the wireless data transfer device has now received information that there are packets to be sent to the mobile network, the wireless data transfer device can send a temporary packet resource allocation request 307, as was described earlier in this specification, by setting a resource allocation request in the acknowledgement message.

Having received the acknowledgement message, the mobile network examines whether the resource allocation request has been set in it. If it has not been set, the mobile network may repeat the transmission of this last packet N times, where N is a value selected in advance. Then the length of the time given to the wireless data transfer device for requesting resources can be set as suitable in the existing systems by selecting N so that on one hand, needlessly long waiting times are avoided, and on the other hand, in practical situations the wireless data transfer device generally has sufficiently long a time for sending the resource allocation request. If the mobile network NW detected that a resource allocation request has been set, the mobile network starts the procedure for establishing a temporary block flow and stops the repeated transmissions of the last packet. In this embodiment, the wireless data transfer device starts the timer T3192 preferably again in connection with the transmission of the acknowledgement message. Correspondingly, the mobile network NW starts the timer T3193 again when it has received the acknowledgement message from the wireless data transfer device MS.

The purpose of starting the above mentioned timers T3168, T3192 is, among other things, to prevent the wireless data transfer device MS from staying to wait for messages sent by the mobile network NW for unnecessarily long a time in error situations, for example. Then, if the wireless data transfer device MS does not receive a packet connection assignment message 308, for example, from the mobile network NW before the time set in the timer T3192 has expired, the wireless data transfer device MS preferably switches to the idle mode in the known manner.

In a system according to yet another embodiment of the invention, the mobile network NW does not automatically send a enquiry message 306 after the last data packet transmitted, but the mobile network NW concludes on the basis of the type of the information to be transferred, for example, whether a need to transfer packets from the wireless data transfer device MS to the mobile network NW is expected. The situation like this is for instance when the information to be transferred consists of signalling messages of the mobile network NW and the wireless data transfer device MS, to which a reply message is expected from the wireless data transfer device MS.

In a system according to yet another preferred embodiment of the invention, the wireless data transfer device MS can conclude whether it has a need to transmit packets to the mobile network NW after the wireless data transfer device MS has received the packets transmitted from the mobile network NW. Then the procedure may preferably be the following. The wireless data transfer device MS sets in the acknowledgement message it sends to the last received packet the information that the wireless data transfer device MS may relatively soon have a need to send packets. This information may include a mention of a period of time after which the wireless data transfer device MS will ask for resources for the transmission of packets, if required. The mobile network can then set time-out consideration and maintain the information needed to establish a new temporary block flow. In this embodiment, the mobile network NW sends the enquiry message 306 mentioned in connection with the description of the first preferred embodiment of the invention preferably after the period of time given by the wireless data transfer device MS. As a reply to this enquiry message, the wireless data transfer device MS sends the resource allocation request 307 in a situation where the wireless data transfer device MS has packets to be transmitted. However, if there are no packets to be sent within the time specified by the time-out information, operation continues preferably in accordance with the prior art. By this arrangement, the use of radio resources can be reduced further when forming the temporary block flows.

By the arrangement according to the invention, the loading of the common control channels can be reduced, because in situations like those described above, the resource allocation request can be implemented by using a data channel, which is assigned to at least the wireless data transfer device in question. Resources are then released from the control channels to other message transmission.

The Relative Reserved Block Period field RRBP mentioned above in the description of the invention can be advantageously applied in the GPRS system, for instance, in the following manner. There are now two bits reserved for the field, and when the present invention is applied, their meaning can be defined according to the following Table 1 in a system used as an example.

TABLE 1

| B0 | B1 | The transmission block period reserved for the wireless data transfer device |
|---|---|---|
| 0 | 0 | Number of TDMA frame = (N + 13) mod 2715648 |
| 0 | 1 | Number of TDMA frame = (N + 17 or N + 18) mod 2715648 |
| 1 | 0 | Number of TDMA frame = (N + 21 or N + 22) mod 2715648 |
| 1 | 1 | Number of TDMA frame = (N + 52 or N + 78) mod 2715648 |

When the wireless data transfer device MS receives a message, which contains the transmission block period field RRBP, the wireless data transfer device MS should send a reply message to the mobile network NW within ca. 60-120 ms (the first 3 alternatives of Table 3) from the reception of this message, depending on the value of the reply block period field. In this preferred embodiment, one row of the transmission block period field (B0=1, B1=1) has been reserved for a situation in which a longer time is reserved for the wireless data transfer device for forming the reply message. In the example of Table 1, this means that the wireless data transfer device MS has approx. 240 ms ((N+52) mod 2715648) or even approx. 360 ms ((N+78) mod 2715648) of time to form the reply message. Then the establishment of a temporary block flow from the wireless data transfer device MS to the mobile network NW can be implemented as follows, for example.

The mobile network NW sets the final bit in the header field of the last data frame to the value true and the value 3 (B0=1, B1=1) to the transmission block period, if the wireless data transfer device does not have a temporary block flow in the direction of the mobile network at the moment. When required, the wireless data transfer device sets in the reply message the information about the need to establish a temporary block flow. If, however, such a temporary block flow already exists, the mobile network preferably sets the value 0 (B0=0, B1=0) in the transmission block period field, whereby the temporary block flow from the mobile network in the direction of the wireless data transfer device can be stopped as soon as possible.

One of the advantages provided by the embodiment described above is the fact that a new enquiry message need not be sent from the mobile network NW to the wireless data transfer device MS, and in spite of this the wireless data transfer device has more time to form the acknowledgement message than in the prior art solutions.

The packets to be transferred in the temporary block flows may be packets that are used for the transfer of information of an application, in which case the information packets are transferred in the known manner from the application level to the lower layers of the protocol stack to be transferred as packets of the RLC/MAC layer. In the Subnetwork Dependent Convergence Protocol (SNDCP) block the packets are divided, if required, to different queues according to the Quality of Service requirements specified for each packet. FIG. 1 shows four Qualities of Service (QoS) by way of example: first class, second class, third class and fourth class. However, with regard to the application of this invention it is not significant as such what kind of requirements for the quality of service have been set for different packets.

The SNDCP block transmits the packets via the Service Access Point (SAP) corresponding to the Quality of Service to the LLC layer. One Logical Link Entity (LLE) for each packet queue corresponding to a Quality of Service has preferably been formed in this logical link control (LLC) layer.

The Logical Link Entity performs the operations of the LLC protocol layer, such as possible retransmissions of the packets. Below the LLC layer, in the connection point between the wireless data transfer device and the mobile network, there is a RLC/MAC (Radio Link Control/Medium Access Control) layer in the protocol stack shown in FIG. 1. In a protocol stack according to the example used here, this is implemented by one RLC block, the tasks of which include for instance requesting the allocation of resources from the mobile network for all packets sent to the radio path.

In FIG. 1, a data transfer connection has been formed between the LLE and RLC block via the RR interface, but it is clear that an arrangement consisting of several RLC blocks can also be used in connection with the invention.

Figure 4:
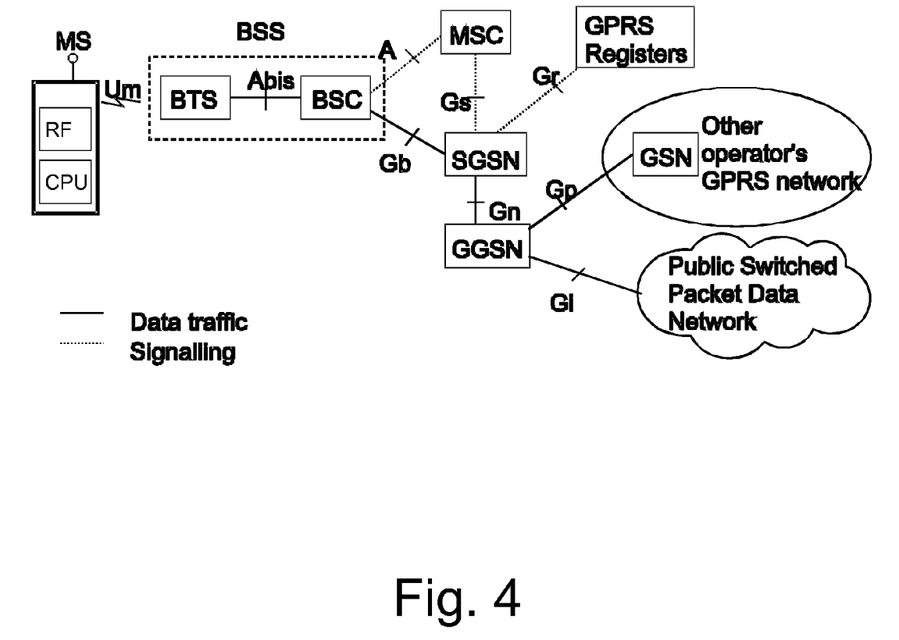
FIG. 4 shows an advantageous system in which the invention can be applied.

FIG. 4 shows the connections of a telecommunications network in a packet-switched GPRS service. In the infrastructure of the network, the main element for the GPRS services is the GPRS Support Node, GSN. It is a mobility router, which implements the connection and co-operation between different data networks, for example to the PSPDN (Public Switched Packet Data Network) via the connection Gi or to the GPRS network of another operator via the connection Gp, mobility management with the GPRS registers via the connection Gr, and the transmission of data packets to wireless data transfer devices MS irrespective of their location. Physically, the GPRS Support Node GSN can be integrated with the Mobile Switching Center (MSC) or it can be a separate network element based on the architecture of the data network routers. User data goes directly between the support node GSN and the base station system BSS consisting of the base stations BTS and base station controllers BSC via the connection Gb, but there is a signalling connection Gs between the support node GSN and the mobile switching center MSC. In FIG. 4, the solid lines between blocks represent data traffic (or the transfer of speech or data in digital form) and the broken lines represent signalling. Physically, data may pass transparently via the mobile switching center MSC. The radio interface between the wireless data transfer device MS and the fixed network goes via the base station BTS and is denoted by the reference Um. The references Abis and A denote the interface between the base station BTS and the base station controller BSC, and correspondingly between the base station controller BSC and the mobile switching centre MSC, which is a signalling connection. The reference Gn represents the connection between different support nodes of the same operator. The support nodes are generally divided into Gateway GPRS Support Nodes (Gateway GSN or GGSN) and Serving GPRS Support Nodes (Serving GSN or SGSN), as shown in FIG. 4. The GSM system is of the Time Division Multiple Access (TDMA) type, in which traffic in the radio path takes place by time division in consecutive TDMA frames, each of which consists of several (eight) time slots. In each time slot, the information packet is sent as a radio frequency burst of finite duration, which consists of a number of modulated bits. The time slots are used mainly as control channels and traffic channels. The traffic channels are used for the transfer of speech and data, and the control channels are used for signalling between the base station BTS and the wireless data transfer devices MS.

The RLC block according to the invention and its functionality can be implemented in the equipment used in the present mobile communication systems by making changes in the parts of the programs that deal with the implementation of the protocol stacks. In a wireless terminal MS the functions can be largely implemented in connection with the processing equipment CPU at least partly by programming. This processing equipment CPU preferably comprises at least one processor, and it can be realized by means of an Application Specific Integrated Circuit (not shown), for example. For radio data transfer, the wireless data transfer device MS is equipped with a radio part RF, in the known manner.

The embodiments are not limited to the above description only, but its details can be modified without departing from the scope defined by the attached claims. The invention can also be applied in the Universal Mobile Telecommunication System (UMTS), for example.

What is claimed is:

1. A method comprising:
   receiving, in a device operating in an active mode, data packets from a communication network via a first temporary packet flow;
   receiving a notification of an end of data packets in said first temporary packet flow,
   transmitting an acknowledgement message to the communication network;
   receiving at least one enquiry message from the communication network via the first temporary packet flow allowing the device to request establishment of a second temporary packet flow, and
   transmitting, in response to said at least one enquiry message, a response message comprising information about a need to send packets.

2. The method according to claim 1, wherein said response message is a request message for an allocation of packet resources.

3. The method according to claim 1 further comprising processing information to be transmitted according to a protocol stack, which includes at least a Radio Link Control/Media Access Control layer.

4. The method according to claim 1, wherein the device is arranged to set a timer upon transmitting the acknowledgement message to the communication network for keeping the device in the active mode.

5. The method according to claim 4, wherein the device has, in addition to the active mode, at least an idle mode, wherein the method further comprises setting the device to the idle mode after the timer has expired if the device does not have packets to be transmitted after at least one enquiry message received from the communication network.

6. The method according to claim 1, wherein the method further comprises setting in said acknowledgement message information about a time of transmission of the enquiry message.

7. The method according to claim 1, wherein the device is a mobile station and the communication network is a GPRS packet-switched network.

8. A method comprising:
   transferring data packets from a network element of a communication network to a device via a first temporary packet flow;
   transmitting a notification of an end of data packets in said first temporary packet flow,
   receiving an acknowledgement message in the network element of the communication network;
   transmitting at least one enquiry message to the device via the first temporary packet flow, said message allowing the device to request establishment of a second temporary packet flow, and
   receiving a response message from the device to said at least one enquiry message if there is a need to send packets by the device to the communication network, said response message comprising information about the need to send packets.

9. The method according to claim 8, wherein the communication network is a GPRS packet-switched network.

10. The method according to claim 8, wherein said response message is a request message for an allocation of packet resources.

11. The method according to claim 8, wherein the method comprises using a last transmitted packet to send the enquiry message.

12. The method according to claim 11, wherein the method further comprises:
repeating the transmission of the enquiry message,
receiving from the device a response message,
examining if the response message comprises information about a need to transmit packets, and if the examination indicates that the information about the need to transmit packets has been included in the response message, starting an establishment of a second temporary block flow from the device to the communication network, otherwise transmitting said enquiry message again.

13. The method according to claim 8, wherein the method comprises using a Packet Power Control/Timing Advance message or a Packet Uplink Assignment message as the enquiry message.

14. A device comprising:
a communication element configured to receive, when operating in an active mode, data packets from a communication network via a first temporary packet flow and a notification of the end of data packets in said first temporary packet flow; wherein
said communication element is configured to transmit an acknowledgement message to the communication network;
said communication element is further configured to receive an enquiry message related to the first temporary packet flow from the communication network allowing the device to request establishment of a second temporary packet flow; and
said communication element is further configured to transmit a response message comprising information about a need to send packets by the device to the communication network.

15. The device according to claim 14, the device further comprising a CPU configured to set in said acknowledgement message information about a time of transmission of the enquiry message.

16. The device according to claim 15, wherein the device is a mobile station.

17. The device according to claim 14, the device further comprising a protocol stack configured to process information to be transmitted, and that the protocol stack comprises at least a Radio Link Control/Media Access Control layer.

18. The device according to claim 14, wherein said response message is a request message for the allocation of packet resources.

19. The device according to claim 15, wherein the CPU is further configured to form the second temporary packet flow to transfer data packets from the device to the communication network.

20. The device according to claim 19, wherein the device has, in addition to the active mode, at least an idle mode, and the device is configured to be set in the idle mode after a timer has expired if the device does not have packets to be transmitted after at least one enquiry message received from the communication network.

21. The device according to claim 14, the device further comprising a CPU configured to set a timer upon transmitting the acknowledgement message to the communication network for keeping the device in the active mode.

22. A network element of a communication network comprising:
a communication element configured to transfer data packets and a notification of an end of the data packets via a first temporary packet flow to a device; wherein
said communication element is configured to receive an acknowledgement message from the device;
said communication element is further configured to transmit at least one enquiry message to the device via the first temporary packet flow 1 said message allowing the device to request establishment of a second temporary packet flow; and
said communication element is further configured to receive a response message from the device to said at least one enquiry message if there is a need to send packets by the device to the communication network, said response message comprising information about the need to send packets.

23. The network element of a communication network according to claim 22 further comprising a protocol stack in the device and the communication network for processing the information to be transmitted, and that the protocol stack comprises at least a Radio Link Control/Media Access Control layer.

24. The network element of a communication network according to claim 22, wherein the network element is a network element of a GPRS packet-switched network.

* * * * *

UNITED STATES PATENT AND TRADEMARK OFFICE
CERTIFICATE OF CORRECTION

PATENT NO. : 7,706,322 B2
APPLICATION NO. : 11/468340
DATED : April 27, 2010
INVENTOR(S) : Hautamaki et al.

It is certified that error appears in the above-identified patent and that said Letters Patent is hereby corrected as shown below:

Column 14, line 29, in Claim 22, delete "flow 1" and insert --flow,--, therefor.

Signed and Sealed this

Twenty-fourth Day of August, 2010

David J. Kappos
*Director of the United States Patent and Trademark Office*